United States Patent
Deshpande (10) Patent No.: US 7,524,343 B2
(45) Date of Patent: Apr. 28, 2009

(54) DUAL STACK COMPACT FUEL PROCESSOR FOR PRODUCING A HYDROGEN RICH GAS

(75) Inventor: Vijay A. Deshpande, Houston, TX (US)

(73) Assignee: Texaco Inc., San Ramon, CA (US)

( * ) Notice: Subject to any disclaimer, the term of this patent is extended or adjusted under 35 U.S.C. 154(b) by 703 days.

(21) Appl. No.: 11/111,202

(22) Filed: Apr. 21, 2005

(65) Prior Publication Data

US 2005/0204627 A1    Sep. 22, 2005

Related U.S. Application Data (63) Continuation of application No. 10/021,673, filed on Dec. 12, 2001, now Pat. No. 6,887,285.

(60) Provisional application No. 60/255,027, filed on Dec. 12, 2000, provisional application No. 60/261,232, filed on Jan. 12, 2001.

(51) Int. Cl.
   *B01J 7/00*    (2006.01)
   *B01J 8/02*    (2006.01)
   *B01J 8/04*    (2006.01)

(52) U.S. Cl. .............. 48/127.9; 422/193; 422/188; 422/190; 422/191; 422/192; 48/61; 48/127.1

(58) Field of Classification Search ........... 48/127.9, 48/127.1; 422/188, 190–193
   See application file for complete search history.

(56) References Cited

U.S. PATENT DOCUMENTS

| | | | |
|---|---|---|---|
| 3,928,178 A | 12/1975 | Frye et al. | |
| 4,522,894 A | 6/1985 | Hwang et al. | |
| 5,858,314 A | 1/1999 | Hsu et al. | |
| 6,103,773 A | 8/2000 | Wittenbrink et al. | |
| 6,299,994 B1 | 10/2001 | Towler et al. | |
| 6,468,480 B1 * | 10/2002 | Clawson et al. | 422/211 |
| 2002/0083646 A1 | 7/2002 | Deshpande et al. | |
| 2002/0088740 A1 | 7/2002 | Krause et al. | |
| 2002/0090326 A1 | 7/2002 | Deshpande | |
| 2002/0090328 A1 | 7/2002 | Deshpande | |
| 2002/0090334 A1 | 7/2002 | Stevens et al. | |
| 2002/0094310 A1 | 7/2002 | Krause et al. | |
| 2002/0098129 A1 | 7/2002 | Martin et al. | |

* cited by examiner

*Primary Examiner*—Alexa Neckel
*Assistant Examiner*—Kaity Handal
(74) *Attorney, Agent, or Firm*—Howrey Simon; Frank C. Turner; Melissa Patangia (57) ABSTRACT

An apparatus for carrying out a multi-step process of converting hydrocarbon fuel to a substantially pure hydrogen gas feed includes a plurality of modules each module being in fluid communication with adjacent modules. The modules may be arranged axially along a common axis of flow or alternatively the modules are arranged along a common axis so that they are nested one within the other. The multi-step process includes: providing a fuel processor having a plurality of modules; and feeding the hydrocarbon fuel successively through each of the modules in the reactor to produce the hydrogen rich gas.

7 Claims, 3 Drawing Sheets

DUAL STACK COMPACT FUEL PROCESSOR FOR PRODUCING A HYDROGEN RICH GAS

CROSS REFERENCE TO RELATED APPLICATIONS

This application is a continuation of U.S. application Ser. No. 10/021,673, filed Dec. 12, 2001, now U.S. Pat. No. 6,887,285 which claimed priority to U.S. Provisional Patent Application No. 60/255,027, filed Dec. 12, 2000 and U.S. Provisional Patent Application No. 60/261,232, filed Jan. 12, 2001.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multistep processes combining an initial conversion process with several clean-up processes. The initial process is most often steam reforming (SR), autothermal reforming (ATR), catalytic partial oxidation (CPOX), or non-catalytic partial oxidation (POX). The cleanup processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. One such illustrative embodiment includes a reforming stack for converting the hydrocarbon fuel feed into a hydrogen rich gas; and a purification stack for producing the hydrogen rich gas suitable for direct feed to a fuel cell. In one preferred illustrative embodiment, the reforming stack includes a first plurality of cylindrical vessels, in which the first plurality of cylindrical vessels are stackable without the need for connecting piping between each vessel. Further, the purification stack includes a second plurality of cylindrical vessels, in which the plurality of cylindrical vessels are stackable without the need for connecting piping between each vessel. One illustrative embodiment has the reforming stack is aligned vertically. The reforming stack of one illustrative embodiment includes a shift vessel, an autothermal reforming vessel, and an anode tail gas oxidation vessel. The purification stack of the illustrative embodiment includes an oxidation vessel, a first desulfurization vessel, and a second desulfurization vessel. In the present illustrative embodiment, the hydrocarbon fuel feed is sequentially introduced first, to the anode tail gas oxidation vessel to produce a preheated hydrocarbon fuel feed; second, to the first desulfurization vessel to produce a desulfurized hydrocarbon fuel feed; third, to the autothermal reforming vessel to produce a first intermediate hydrogen stream; fourth, to the second desulfurization vessel to produce a desulfurized intermediate hydrogen stream; fifth, to the shift vessel to produce a second intermediate hydrogen stream; and sixth, to the preferential oxidation vessel to produce the hydrogen rich gas.

Turning now to the anode tail gas oxidation vessel, one illustrative embodiment of the anode tail gas oxidation vessel includes: an oxidation core containing a water gas shift catalyst for oxidizing fuel cell anode tail gas to produce a hot exhaust gas; and a first finned section having a plurality of external vertical fins surrounding the oxidation core for dissipating the heat of reaction produced within the oxidation core. The design of the illustrative anode tail gas oxidation vessel is such that the hydrocarbon fuel feed is introduced to the first finned section to produce the preheated hydrocarbon fuel feed. In one illustrative embodiment of the present invention, the compact fuel processor, a heat exchanger for heating water with the hot exhaust gas to produce a preheated water stream.

The illustrative compact fuel processors of the present invention utilize a variety of heat exchanger to integrate and use the heat generated by certain sections to preheat feed or provide heat for endothermic reactions. In one such illustrative embodiment, the autothermal reforming vessel includes: a reforming core containing an autothermal reforming catalyst for reacting the desulfurized hydrocarbon fuel feed, the preheated water stream, and air to produce the first intermediate hydrogen stream; and a spiral exchanger section surrounding the reforming core. These are designed such that the spiral exchanger section contains two channels for preheating the desulfurized hydrocarbon fuel feed with the first intermediate hydrogen stream. In a similar manner one illustrative embodiment of the present invention includes a shift reactor vessel that includes a shift reactor core containing a water gas shift catalyst for reacting the desulfurized intermediate hydrogen stream and water to produce the second intermediate hydrogen stream and a second finned section having a plurality of external vertical fins surrounding the shift core for dissipating the heat of reaction produced in the shift core. The shift reactor vessel is designed such that the desulfurized intermediate hydrogen stream is preheated in the second finned section prior to being introduced to the shift reactor core. It should be appreciated by one of skill in the art that within the above illustrative embodiments, the first desulfurization vessel includes a desulfurization catalyst bed for substantially desulfurizing the preheated hydrocarbon fuel feed to produce a desulfurized hydrocarbon fuel feed. Further it should be appreciated that the second desulfurization vessel includes a desulfurization catalyst bed for substantially desulfurizing the first intermediate hydrogen stream to produce a desulfurized intermediate hydrogen stream. An illustrative embodiment of the preferred oxidation vessel includes a preferred oxidation catalyst bed for reacting air and the second intermediate hydrogen stream to produce the hydrogen rich gas; and a heat exchange chamber for cooling the hydrogen rich gas with water in a cooling coil.

Alternatively the present invention includes a compact fuel processor for converting a hydrocarbon fuel feed into hydrogen rich gas that generally has a nested configuration for the reactors. In one such illustrative embodiment, a reforming module for converting the hydrocarbon fuel feed into the hydrogen rich gas, wherein the hydrogen rich gas is suitable for direct feed to a fuel cell; and an oxidizing module for oxidizing fuel cell anode tail gas to produce a hot exhaust gas, wherein the hot exhaust preheats the hydrocarbon fuel feed to the reforming module. The oxidizing module of the illustrative embodiment includes: a first heat exchanger core; an oxidation core vessel containing an oxidation catalyst; and a first desulfurizing vessel surrounding the oxidation core vessel and forming a first annular space filled with desulfurization catalyst. This is designed such that the oxidation core vessel oxidizes the fuel cell anode tail gas to produce a hot exhaust gas; and the hydrocarbon fuel feed is preheated by the hot exhaust gas in the first heat exchanger coil to produce a preheated hydrocarbon fuel feed. Further, the design is such that the preheated hydrocarbon fuel feed is desulfurized in the first annular space to create a desulfurized hydrocarbon fuel feed. The oxidation core vessel of one preferred illustrative embodiment of the present invention has a first set of external vertical fins for further preheating the preheated hydrocarbon fuel feed to produce a second preheated hydrocarbon fuel feed, and the second preheated hydrocarbon fuel feed becomes the hydrocarbon fuel feed introduced into the first annular space.

The illustrative compact fuel processor has a reforming module that includes: a second heat exchanger coil; a reforming core vessel containing an autothermal reforming catalyst bed; a second desulfurizing vessel surrounding the reforming core vessel and forming a second annular space filled with desulfurization catalyst; a shift vessel surrounding the second desulfurizing vessel and forming a third annular space filled with water gas shift catalyst; and a preferred oxidation vessel surrounding the shift vessel and forming a fourth annular space filled with preferred oxidation catalyst. The illustrative reforming module is designed such that the hydrocarbon fuel feed is preheated by the hydrogen rich gas in the second heat exchanger coil to produce a third preheated hydrocarbon fuel feed; and the third preheated hydrocarbon fuel feed is sequentially introduced to the reforming core vessel, then to the second annular space, then to the third annular space, and then to the fourth annular space to produce the hydrogen rich gas. It is preferred that the hydrocarbon fuel feed is a desulfurized hydrocarbon fuel feed. In one alternative illustrative embodiment the reforming core vessel has a second set of external vertical fins for further preheating the third preheated hydrocarbon fuel feed to produce a fourth preheated hydrocarbon fuel feed. Thus, the fourth preheated hydrocarbon fuel feed becomes the hydrocarbon fuel feed introduced to the reforming core vessel. It should be appreciated that the third annular space can have a third heat exchanger coil for reaction temperature control. Further it should be appreciated that the compact fuel processor can have an electrical heater for starting up the autothermal reforming catalyst bed.

A greater appreciation and understanding of the present invention and the above noted illustrative embodiments can be achieved upon reference to the following figures and accompanying descriptions.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
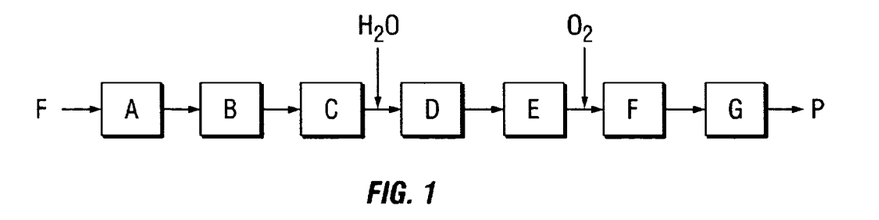
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants trough the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad \text{(I)}$$

$$CH_4 + H_2O \rightarrow 3H_2 + CO \qquad \text{(II)}$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F. The oxygen is consumed by the reactions of process step G described below.

The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \tag{V}$$

$$H_2 + \tfrac{1}{2}O_2 \rightarrow H_2O \tag{VI}$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

In one illustrative embodiment of the present invention, the fuel processor is of modular construction having dual reactor stacks which include a reforming stack and a purification stack. Each stack is composed of individual modular units, which are separable, rearrangeable, and individually replaceable. The modular units may be used in any orientation, e.g., vertical or horizontal orientation. The illustrated combination of dual reactor stacks is adapted to be used in conjunction with a fuel cell such that the hydrogen rich product gas of the reactor described herein is supplied directly to a fuel cell as a feed stream. While the modules can have any cross sectional configuration, such as circular, rectangular, triangular, etc., a circular cross section is preferred resulting in the reactor stacks having a generally tubular shape.

The modules can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed. The operating pressure of the fuel processor depends upon the delivery pressure required by the fuel cell. For fuel cells operating in the 1 to 20 kW range an operating pressure of 0 to about 100 psig is generally sufficient. The modules are of such dimensions so as to safely contain the reaction at the desired operating pressures and temperatures.

Figure 2:
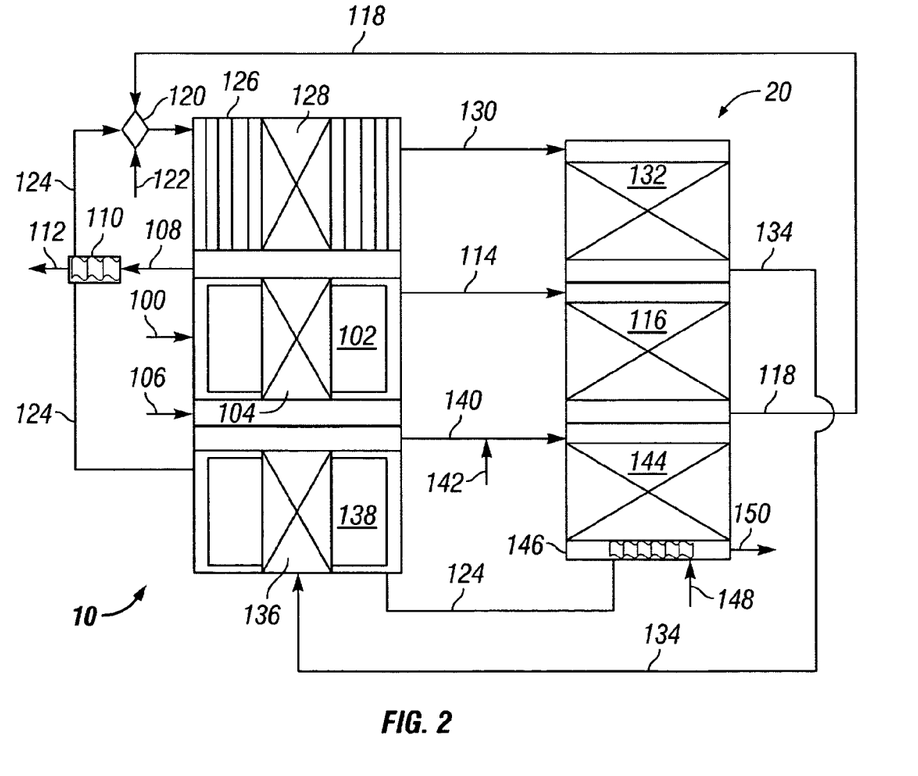
FIG. 2 depicts a first illustrative embodiment of a compact fuel processor apparatus of the present invention.

Turning now to FIG. 2, a dual stack fuel processor is shown including a reforming stack 10 and a purification stack 20. Fuel 100 is preheated by the vertical finned heat exchanger that serves as the heat sink for the anode tail gas oxidizer 104. The anode tail gas oxidizer oxidizes the unused gas from the anode of the fuel cell (not shown) using catalytic combustion. The heat generated is transferred by the vertical finned heat exchanger 102 to the fuel to preheat the fuel. The exhaust from the anode tail gas oxidizer 108 is sent to a second heat exchanger where any remaining heat is transferred to a water stream 124. The preheated fuel 114 is directed to a first desulfurization reactor 116, in which sulfur compounds present in the fuel are removed catalytically. The desulfurized fuel 118 is then routed to the start-up (120) heater. The start-up heater plays two roles, first to provide a mixing point for the fuel 118, air 122 and water 124 that are needed for the auto-thermal reforming reactor 128. Secondly, the startup heater can be used during start-up to provide the additional heat to the fuel/air/water mixture needed to initiate the auto-thermal reformation reaction. The auto-thermal reformation reactor is composed of a spiral heat exchanger that simultaneously preheats the fuel/air/water mixture and cools the resulting product gas which is mostly a mixture of hydrogen, carbon monoxide, carbon dioxide and nitrogen gases. Such a spiral heat exchanger is described in greater detail in co-pending application entitled: "Reactor Module for Use in a Compact Fuel Processor" filed on Dec. 5, 2001, the contents of which are hereby incorporated by reference.

Figure 3A:
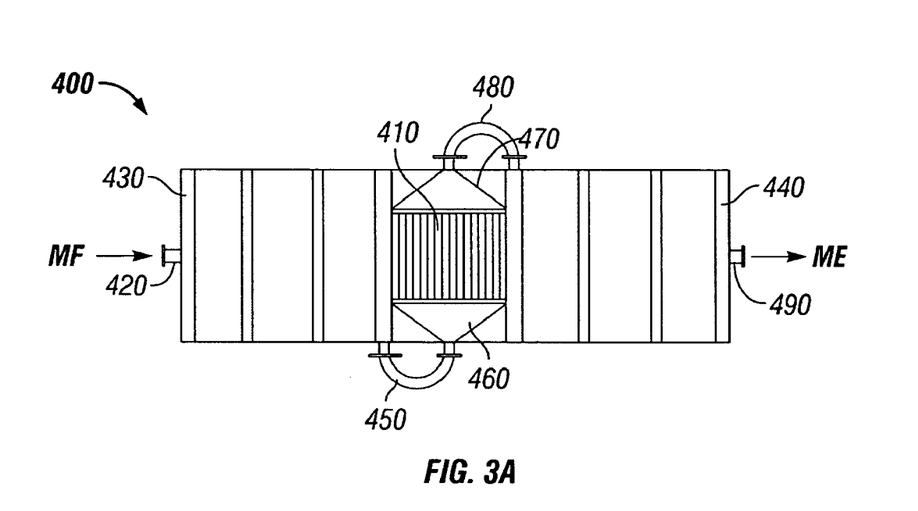
FIGS. 3A and 3B depict a spiral heat exchanger combined with a reactor core utilized in an illustrative embodiment of the present invention.
Figure 3B:
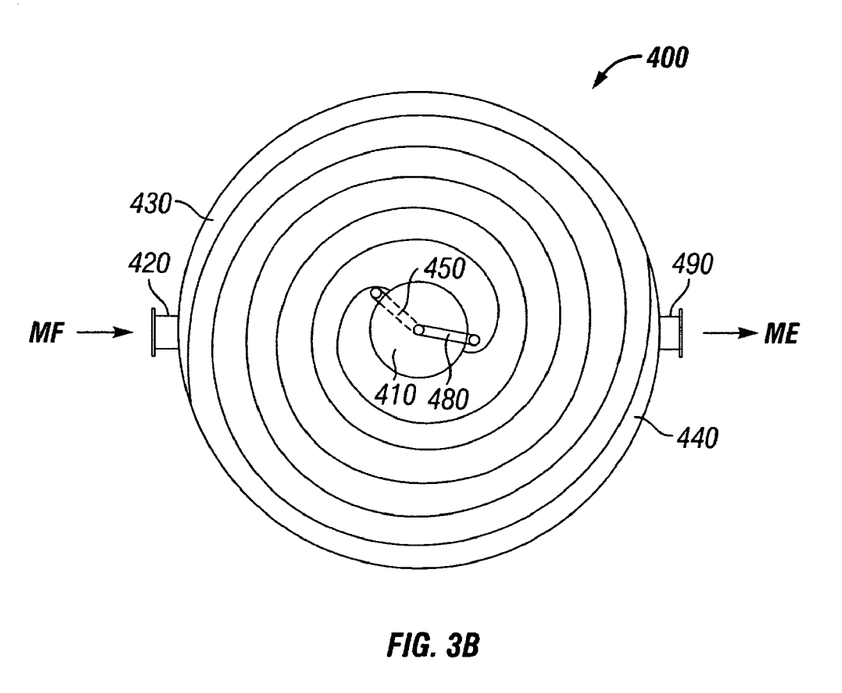

A specific illustrative example of such a heat exchanger is shown in FIGS. 3A and 3B. Such and illustrative reactor module comprises a spiral heat exchanger with a fixed bed reactor located in the core of the spiral heat exchanger. In order to maximize heat transfer in a typical spiral heat exchanger design, hot fluid is introduced into the core of the unit and spirals outward toward the outside channel, while the cold fluid enters the unit at the outside channel and spirals towards the core. Countercurrent flow is usually employed between the hot and cold channels in a spiral exchanger to maximize heat transfer. The present invention takes advantage of this type of heat exchange to preheat a reactor feed with the hot reactor effluent produced by a reactor bed located at the core of the spiral exchanger. This design results in lower pressure drops, higher energy efficiency, short flow paths, and creates a compact modular design consistent with a compact fuel processor.

FIG. 3A illustrates an overhead cross-sectional view of one illustrative embodiment of such a reactor module. FIG. 3B illustrates a side cross-sectional view of one illustrative embodiment of such a reactor module. Reactor module 400 consists essentially of a spiral exchanger with a fixed bed reactor 410 located in the core of the spiral exchanger. The spiral heat exchanger portion of the module is composed of two long, flat plates wrapped around the reactor core, creating two concentric spiral channels—an inlet spiral passage 430 and an outlet spiral passage 440. The channels are seal-welded on alternate sides to provide a sturdy barrier between the fluids. A cover is fitted on each side, and a full-faced gasket is positioned between each cover and spiral element to prevent leaks.

Module feed MF enters reactor module 400 at module inlet nozzle 420, is introduced into inlet spiral passage 430, and proceeds through inlet spiral passage 430 to reactor inlet piping 450. A flow distribution manifold 460 is utilized to evenly distribute flow into reactor 410. Reactor 410 is an autothermal reforming reactor as in process step A of FIG. 1. The reactor may be a fixed bed reactor containing supported catalyst particles or the reactor bed may be a monolith with catalytic material coated on to the surface of the structural members, the choice of catalyst being a design decision consistent with the considerations discussed previously regarding the process steps of FIG. 1.

A flow collection manifold 470 is utilized to direct the hot reactor product to the reactor outlet piping 480. From there, the hot product gases proceed through the outlet spiral passage, and ultimately the cooled module effluent ME is produced from the module outlet nozzle 490. Such an apparatus as described herein can be designed by one skilled in the art to effectively and efficiently preheat the module feed MF to the appropriate reaction temperature before entering the reactor while cooling the hot reaction product to an appropriate temperature for further processing in the fuel processor. Module 400 in this illustrative embodiment shows the spiraling relationship between the inlet spiral passage 430 and the outlet spiral passage 440, but one of skill in the art should appreciate that the extent of spiraling utilized in the present invention is a design consideration unique to the reaction and operating conditions of each specific module.

The cooled product gas of the auto-thermal reformation reactor 130 is then returned to the purification stack in which a desulfurzation reaction is carried out in the second desulfurization reactor 132. The desulfurized gas 134 is then provided to the water gas shift reactor 136. The water gas shift reactor, like the anode tail gas oxidizer reactor, utilizes vertical finned heat exchangers 138 to regulate the temperature of the reaction. Heat is absorbed by water stream 124. The product gas of the shift reactor is combined with air or another suitable oxygen source 142 and the mixture is fed to the preferential oxidation reactor 144. The preferential oxidation reactor 144 substantially removes traces of carbon monoxide that may be present by use of a selective oxidation catalyst. A heat exchanger 146 controls the temperature of the partial oxidation reactor and preheats water 148 a portion of which is used as feed to the auto-thermal reformation reactor. Suitably pure hydrogen gas 150 is produced from the preferential oxidation reactor 144. The hydrogen containing gas is preferably used in a fuel cell or may be stored or used in other processes.

One of skill in the art after reviewing the above description should understand and appreciate that each module performs a separate operational function and is generally configured as shown in FIG. 2. Feed stream F (100) is introduced through inlet pipe (not shown) and product gas P (150) is drawn off via outlet pipe (not shown). Module 128 is the autothermal reforming module corresponding to process step A of FIG. 1. The autothermal reforming module has built into is a spiral heat exchanger the simultaneously heats the incoming fuel mixture and cools the outgoing product gas which corresponds to process step B of FIG. 1. Module 132 is a purifying module corresponding to process step C of FIG. 1. Module 136 is a water gas shift module corresponding to process step E of FIG. 1. The cooling step corresponding to process step F of FIG. 1 is carried out by vertical finned heat exchanger 138. In this illustrative embodiment, heat exchanger 138 is shown as a general heat sink for Module 136. Module 144 is an oxidation step corresponding to process step G of FIG. 1. Air source 142 provides a source for oxygen to process gas for the oxidation reaction (Equation V) of Module 144. Module 144 also contains a heat exchanger 146 (partially shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Figure 4:
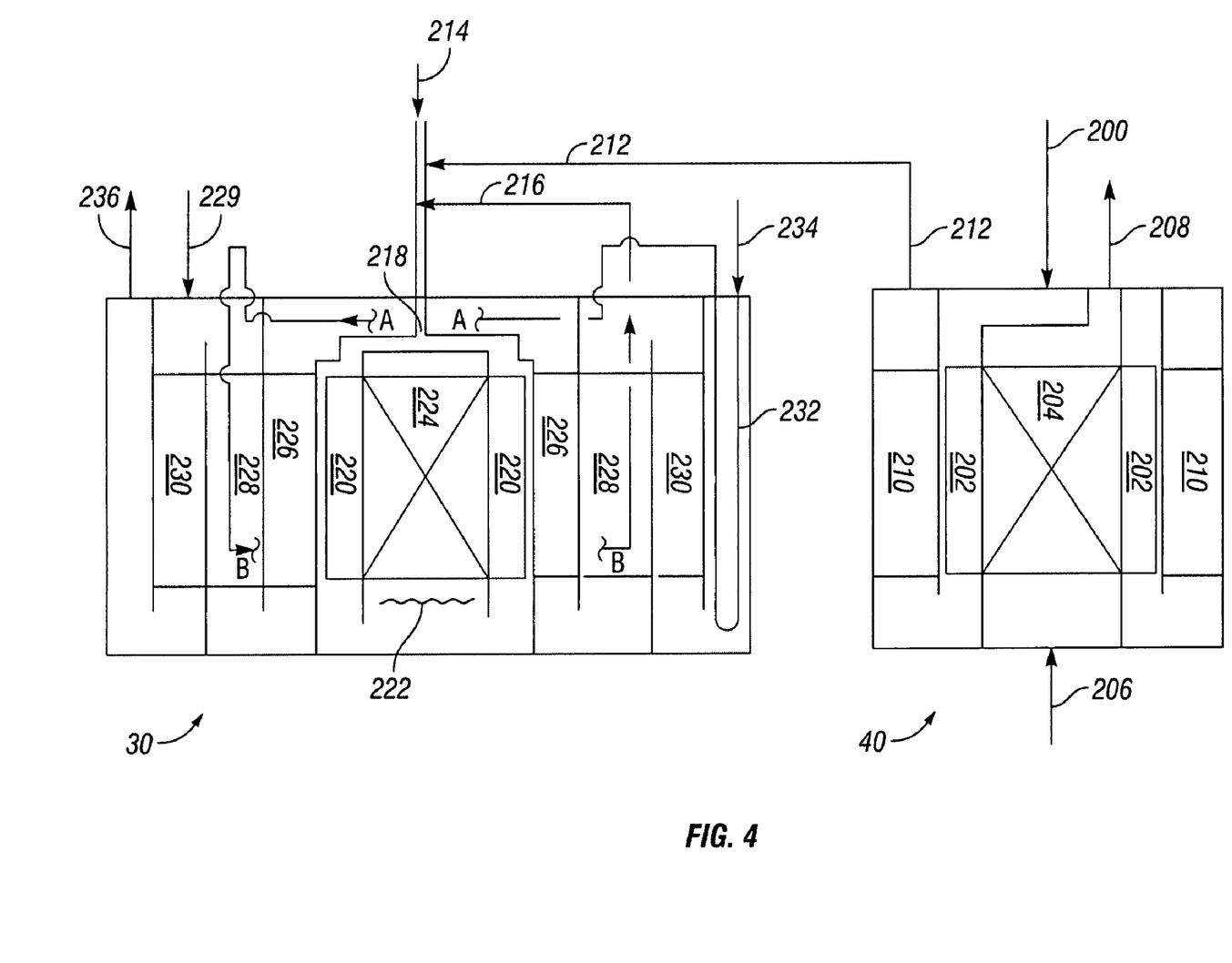
FIG. 4 depicts a second illustrative embodiment of a compact fuel processor apparatus of the present invention.

Turning now to FIG. 4, an alternative illustrative embodiment of a dual stack fuel processor is shown in which there is a reforming stack 30 and a oxidizing stack 40. As will become apparent below, the reforming stack 30 generally carries out the reformation process in which fuel is converted into suitably pure hydrogen gas for use with a fuel cell (not shown). The oxidation stack generally serves as a means for recovering the heat content of the anode tail gas generated by the fuel cell and preheats the fuel for the reforming stack.

Fuel 200 is provided to the oxidizing stack 40 that includes two major components, the anode tail gas oxidation reactor 204 and the desulfurization reaction 210. The anode tail gas oxidation reactor is designed such that it catalytically oxidizes the anode tail gas 206 generated from a fuel cell. The heat generated is transferred to the fuel 200 by vertical fin heat exchangers 202 generating a cooled exhaust 208. The heated fuel is then subjected to a desulfurization reactor 210 that substantially removes the sulfur compounds present in the fuel. The desulfurized fuel 212 is provided to the reforming stack 30 and combined with air 214 and hot water/steam 216. This mixture of fuel/air/water passes through a distribution manifold 218 which directs the mixture through a vertical fin heat exchanger 220. The pre heated fuel/air/water mixture is then introduced into the auto-thermal reformation reactor 224. During start-up, an electrical pre-heater element 222 is installed at the bottom of the auto-thermal reformation reactor. However, once started the heat generated by the auto-thermal reformation reactor is sufficient to heat the fuel/air/water mixture via the vertical finned heat exchangers 220. The product gas from the auto-thermal reforming reactor is directed to a second desulfurization reactor 226 which removes any remaining sulfur compounds from the gas product stream. The desulfurized gas is then introduced into the water-gas shift reactor 228. The temperature of the shift reactor is controlled by tube heat exchangers 232. It should be noted at this point that the heat exchanger in the present illustrative embodiment is designed as one continuous tube routed throughout the reforming stack. Points A and B are respectively connected to each other such that the flow of water through the tube is continuous. After passing through the shift reactor, air 229 is mixed with the hydrogen containing gas and passed to a preferential oxidation reactor 230. In the preferential oxidation reactor trace amounts of carbon monoxide are removed so as to purify the hydrogen containing gas for use in a fuel cell. The product gas if further cooled by heat exchanger coils 232 and leaves the reforming stack as hydrogen containing gas 236. The hydrogen containing gas is preferably used in a fuel cell or may be stored or used in other processes.

One of skill in the art after reviewing the above description should understand and appreciate that each module performs a separate operational function. Feed stream F (200) is introduced through inlet pipe (not shown) and product gas P (236) is drawn off via outlet pipe (not shown). Module 224 is the autothermal reforming module corresponding to process step A of FIG. 1. The autothermal reforming module has built into it a vertical fin heat exchanger the simultaneously heats the incoming fuel mixture and cools the outgoing product gas which corresponds to process step B of FIG. 1. An electric heater 222, is installed at the bottom inlet of the autothermal reformation reactor for start-up heat. Module 226 is a purifying module corresponding to process step C of FIG. 1. Module 228 is a water gas shift module corresponding to process step E of FIG. 1. The cooling step corresponding to process step F of FIG. 1 is carried out by finned tube heat exchanger 232. In this illustrative embodiment, heat exchanger 232 is shown as a general heat sink for the entire reforming stack, however, one of skill in the art could redesign the heat exchangers to have multiple flows and heat exchangers. Module 230 is an oxidation step corresponding to process step G of FIG. 1. Air source 229 provides a source for oxygen to process gas for the oxidation reaction (Equation V) of Module 230. Module 230 also contains a heat exchanger 232 (partially shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Upon review of the above disclosure one of ordinary skill in the art should understand and appreciate that one illustrative embodiment of the present invention is a compact fuel processor for converting a hydrocarbon fuel feed into a purified hydrogen rich gas. Such an illustrative embodiment includes a reforming stack for converting the hydrocarbon fuel feed into a hydrogen rich gas; and a purification stack for producing the hydrogen rich gas suitable for direct feed to a fuel cell. In one preferred illustrative embodiment, the reforming stack includes a first plurality of cylindrical vessels, in which the first plurality of cylindrical vessels are stackable without the need for connecting piping between each vessel. Further, the purification stack includes a second plurality of cylindrical vessels, in which the plurality of cylindrical vessels are stackable without the need for connecting piping between each vessel. One illustrative embodiment has the reforming stack is aligned vertically.

The reforming stack of one illustrative embodiment includes a shift vessel, an autothermal reforming vessel, and an anode tail gas oxidation vessel. The purification stack of the illustrative embodiment includes an oxidation vessel, a first desulfurization vessel, and a second desulfurization vessel.

In the present illustrative embodiment, the hydrocarbon fuel feed is sequentially introduced first, to the anode tail gas oxidation vessel to produce a preheated hydrocarbon fuel feed; second, to the first desulfurization vessel to produce a desulfurized hydrocarbon fuel feed; third, to the autothermal reforming vessel to produce a first intermediate hydrogen stream; fourth, to the second desulfurization vessel to produce a desulfurized intermediate hydrogen stream; fifth, to the shift vessel to produce a second intermediate hydrogen stream; and sixth, to the preferential oxidation vessel to produce the hydrogen rich gas. Turning now to the anode tail gas oxidation vessel, one illustrative embodiment of the anode tail gas oxidation vessel includes: an oxidation core containing a water gas shift catalyst for oxidizing fuel cell anode tail gas to produce a hot exhaust gas; and a first finned section having a plurality of external vertical fins surrounding the oxidation core for dissipating the heat of reaction produced within the oxidation core. The design of the illustrative anode tail gas oxidation vessel is such that the hydrocarbon fuel feed is introduced to the first finned section to produce the preheated hydrocarbon fuel feed. In one illustrative embodiment of the present invention, the compact fuel processor, a heat exchanger for heating water with the hot exhaust gas to produce a preheated water stream.

The illustrative compact fuel processors of the present invention utilize a variety of heat exchanges to integrate and use the heat generated by certain section to preheat feed or provide heat for endothermic reactions. In one such illustrative embodiment, the autothermal reforming vessel includes: a reforming core containing an autothermal reforming catalyst for reacting the desulfurized hydrocarbon fuel feed, the preheated water stream, and air to produce the first intermediate hydrogen stream; and a spiral exchanger section surrounding the reforming core. These are designed such that the spiral exchanger section contains two channels for preheating the desulfurized hydrocarbon fuel feed with the first intermediate hydrogen stream. In a similar manner one illustrative embodiment of the present invention includes a shift reactor vessel that includes a shift reactor core containing a water gas shift catalyst for reacting the desulfurized intermediate hydrogen stream and water to produce the second intermediate hydrogen stream and a second finned section having a plurality of external vertical fins surrounding the shift core for dissipating the heat of reaction produced in the shift core. The shift reactor vessel is designed such that the desulfurized intermediate hydrogen stream is preheated in the second finned section prior to being introduced to the shift reactor core. It should be appreciated by one of skill in the art that within the above illustrative embodiments, the first desulfurization vessel includes a desulfurization catalyst bed for substantially desulfurizing the preheated hydrocarbon fuel feed to produce a desulfurized hydrocarbon fuel feed. Further it should be appreciated that the second desulfurization vessel includes a desulfurization catalyst bed for substantially desulfurizing the first intermediate hydrogen stream to produce a desulfurized intermediate hydrogen stream. An illustrative embodiment of the preferred oxidation vessel includes a preferred oxidation catalyst bed for reacting air and the second intermediate hydrogen stream to produce the hydrogen rich gas; and a heat exchange chamber for cooling the hydrogen rich gas with water in a cooling coil.

One of ordinary skill in the art, upon review of the present disclosure, should also appreciate that another illustrative embodiment of the present invention includes a compact fuel processor for converting a hydrocarbon fuel feed into hydrogen rich gas that generally has a radial flow through the reactor. In one such illustrative embodiment, a reforming module for converting the hydrocarbon fuel feed into the hydrogen rich gas, wherein the hydrogen rich gas is suitable for direct feed to a fuel cell; and an oxidizing module for oxidizing fuel cell anode tail gas to produce a hot exhaust gas, wherein the hot exhaust preheats the hydrocarbon fuel feed to the reforming module.

The oxidizing module of the illustrative embodiment includes: a first heat exchanger core; an oxidation core vessel containing an oxidation catalyst; and a first desulfurizing vessel surrounding the oxidation core vessel and forming a first annular space filled with desulfurization catalyst.

This is designed such that the oxidation core vessel oxidizes the fuel cell anode tail gas to produce a hot exhaust gas; and the hydrocarbon fuel feed is preheated by the hot exhaust gas in the first heat exchanger coil to produce a preheated hydrocarbon fuel feed. Further, the design is such that the preheated hydrocarbon fuel feed is desulfurized in the first annular space to create a desulfurized hydrocarbon fuel feed. The oxidation core vessel of one preferred illustrative embodiment of the present invention has a first set of external vertical fins for further preheating the preheated hydrocarbon fuel feed to produce a second preheated hydrocarbon fuel feed, and the second preheated hydrocarbon fuel feed becomes the hydrocarbon fuel feed introduced into the first annular space.

The illustrative compact fuel processor has a reforming module that includes: a second heat exchanger coil; a reforming core vessel containing an autothermal reforming catalyst bed; a second desulfurizing vessel surrounding the reforming core vessel and forming a second annular space filled with desulfurization catalyst; a shift vessel surrounding the second desulfurizing vessel and forming a third annular space filled with water gas shift catalyst; and a preferred oxidation vessel surrounding the shift vessel and forming a fourth annular space filled with preferred oxidation catalyst. The illustrative reforming module is designed such that the hydrocarbon fuel feed is preheated by the hydrogen rich gas in the second heat exchanger coil to produce a third preheated hydrocarbon fuel feed; and the third preheated hydrocarbon fuel feed is sequentially introduced to the reforming core vessel, then to the second annular space, then to the third annular space, and then to the fourth annular space to produce the hydrogen rich gas. It is preferred that the hydrocarbon fuel feed is a desulfurized hydrocarbon fuel feed. In one alternative illustrative embodiment the reforming core vessel has a second set of external vertical fins for further preheating the third preheated hydrocarbon fuel feed to produce a fourth preheated hydrocarbon fuel feed. Thus, the fourth preheated hydrocarbon fuel feed becomes the hydrocarbon fuel feed introduced to the reforming core vessel. It should be appreciated that the third annular space can have a third heat exchanger coil for reaction temperature control. Further it should be appreciated that the compact fuel processor can have an electrical heater for starting up the autothermal reforming catalyst bed.

Yet another illustrative embodiment of the present invention is a compact fuel processor for converting a hydrocarbon fuel feed into hydrogen rich gas, that includes a heat exchanger coil; a reforming core vessel containing an autothermal reforming catalyst bed; a desulfurizing vessel surrounding the reforming core vessel and forming a first annular space filled with desulfurization catalyst; a shift vessel surrounding the desulfurizing vessel and forming a second annular space filled with water gas shift catalyst; and a preferred oxidation vessel surrounding the shift vessel and forming a third annular space filled with preferred oxidation catalyst. Such an illustrative compact fuel processor is designed such that the hydrocarbon fuel feed is preheated by the hydrogen rich gas in the heat exchanger coil to produce a preheated hydrocarbon fuel feed; and the preheated hydrocarbon fuel feed is sequentially introduced to the reforming core vessel, then to the second annular space, then to the third annular space, and then to the fourth annular space to produce the hydrogen rich gas.

It is preferred within this illustrative embodiment that the reforming core vessel has a set of external vertical fins for further preheating the preheated hydrocarbon fuel feed to produce a second preheated hydrocarbon fuel feed. Thus, the second preheated hydrocarbon fuel feed becomes the preheated hydrocarbon fuel feed introduced to the reforming core vessel. It should also be noted that the second annular space may have a second heat exchanger coil for reaction temperature control. Further the present illustrative embodiment can include an electrical heater for starting up the autothermal reforming catalyst bed.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A compact fuel processor for converting a hydrocarbon fuel feed into hydrogen rich gas, comprising:

a reforming module for converting the hydrocarbon fuel feed into the hydrogen rich gas, wherein the hydrogen rich gas is suitable for direct feed to a fuel cell; and an oxidizing module for oxidizing fuel cell anode tail gas to produce a hot exhaust gas, wherein the hot exhaust preheats the hydrocarbon fuel feed to the reforming module;

wherein the oxidizing module comprises: a first heat exchanger core; an oxidation core vessel containing an oxidation catalyst; and a first desulfurizing vessel surrounding the oxidation core vessel and forming a first annular space filled with desulfurization catalyst; and wherein the oxidation core vessel oxidizes the fuel cell anode tail gas to produce a hot exhaust gas; and wherein the hydrocarbon fuel feed is preheated by the hot exhaust gas in the first heat exchanger coil to produce a preheated hydrocarbon fuel feed; and wherein the preheated hydrocarbon fuel feed is desulfurized in the first annular space to create a desulfurized hydrocarbon fuel feed.

2. The compact fuel processor of claim 1, wherein the oxidation core vessel has a first set of external vertical fins for further preheating the preheated hydrocarbon fuel feed to produce a second preheated hydrocarbon fuel feed, and wherein the second preheated hydrocarbon fuel feed becomes the hydrocarbon fuel feed introduced to the first annular space.

3. The compact fuel processor of claim 1, wherein the reforming module comprises:

a second heat exchanger coil;

a reforming core vessel containing an autothermal reforming catalyst bed;

a second desulfurizing vessel surrounding the reforming core vessel and forming a second annular space filled with desulfurization catalyst;

a shift vessel surrounding the second desulfurizing vessel and forming a third annular space filled with water gas shift catalyst; and a preferred oxidation vessel surrounding the shift vessel and forming a fourth annular space filled with preferred oxidation catalyst; and wherein the hydrocarbon fuel feed is preheated by the hydrogen rich gas in the second heat exchanger coil to produce a third preheated hydrocarbon fuel feed; and wherein the third preheated hydrocarbon fuel feed is sequentially introduced to the reforming core vessel, then to the second annular space, then to the third annular space, and then to the fourth annular space to produce the hydrogen rich gas.

4. The compact fuel processor of claim 3, wherein the hydrocarbon fuel feed is a desulfurized hydrocarbon fuel feed.

5. The compact fuel processor of claim 3, wherein the reforming core vessel has a second set of external vertical fins for further preheating the third preheated hydrocarbon fuel feed to produce a fourth preheated hydrocarbon fuel feed, and wherein the fourth preheated hydrocarbon fuel feed becomes the hydrocarbon fuel feed introduced to the reforming core vessel.

6. The compact fuel processor of claim 3, wherein the third annular space has a third heat exchanger coil for reaction temperature control.

7. The compact fuel processor of claim 3, further comprising an electrical heater for starting up the autothermal reforming catalyst bed.

* * * * *